Feb. 21, 1928.
J. H. FAHEY
1,660,262
BOLT AND SCREW CLIP
Filed Feb. 3, 1926
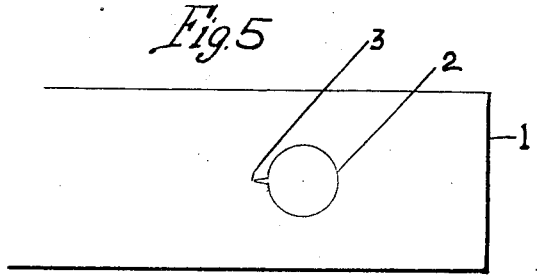
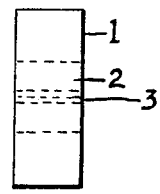
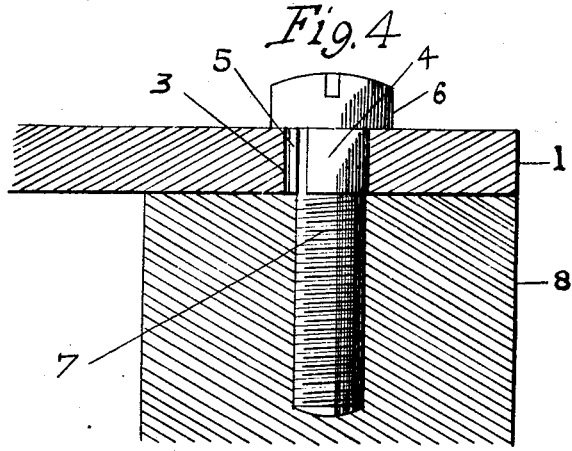
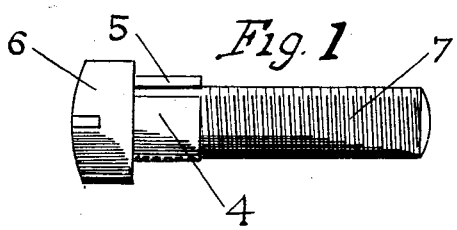
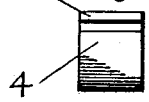
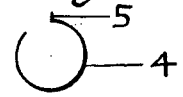
John Henry Fahey Inventor Patented Feb. 21, 1928.

1,660,262

UNITED STATES PATENT OFFICE.

JOHN HENRY FAHEY, OF PITTSFIELD, MASSACHUSETTS.

BOLT AND SCREW CLIP.

Application filed February 3, 1926. Serial No. 85,748.

This invention relates to clips, and more particularly to bolt and screw clips intended for locking the bolt or screw against retrograde rotation, so that vibrations of the work or body in which the bolt or screw is mounted, will not cause loosening of the bolt or screw.

A further object of this invention is to provide a clip device which will lock by friction a bolt or screw and which is made from yieldable or spring material, and which partly encircles the body of said bolt or screw.

A further object of this invention is to provide a clip of this character that as soon as placed on bolt or screw, tension is set up causing friction, which will always be constant, thereby keeping said bolt or screw in proper place.

Figure 1 is a side elevation showing bolt with clip applied thereon,

Figure 2 is a side elevation,

Figure 3 is an end view of the clip,

Figure 4 is a sectional view showing the bolt with the clip applied as in use,

Figure 5 is a plan view of the work in which the clip is inserted and held,

Figure 6 is an end view of same.

In the drawings, 1 represents a bottom plate of metal or wood through which the bolt 7 is passed to be screwed into the base block 8, this plate 1 is provided with a bore 2 and a small groove 3 through plate 1 merges into this bore, this bore is adapted to receive the clip 4 which is a split ring or sleeve of yieldable or spring material, or metal that will take a temper; one end of the split sleeve is bent to form a lip or fin 5 which is inserted in the groove or channel 3 to hold it in place when once placed in the bore. The free end of the clip is made with a sharp or ragged edge which will embed or bite itself into the bolt or screw due to its inherent tension.

This clip can be used where holes are countersunk; it can also be used on headless screws or guide studs.

The operation of the device is as follows:

The necessary bore and merging groove 2 and 3 being provided, the split ring 4 is placed on the threadless portion of the bolt or screw, which is commonly just beneath the head; the clip encircling the body of the screw, the lip 5 of the clip engages in the groove 3, and the screw element is then screwed home. The clip is held from turning with the screw element by virtue of the lip 5 being held in the groove 3 and as soon as the screw comes to rest the inherent tension or temper in the clip causes the same to hug the same with strong friction which will prevent retrograde or loosening rotation due to vibrations that may be set up in the base block.

This clip is preferably formed of a small strip of yieldable or spring material, centrally bent, with a flange on one end. This clip is placed on with a tension, which forms a friction around bolt or screw.

In placing bolt or screw in position, the lip or flange of the clip is entered into the groove, holding the clip from rotation, while the remainder of the bolt or screw is turned into position.

Having thus described the invention, I claim:

1. The combination with a base plate having a bore therein and a groove merging into said bore, of a split ring of inherent elasticity adapted to encircle a bolt or screw with such frictional tension as to permit of relative longitudinal play but prevent independent retrograde rotative movement, said clip being interlocked with said bore to prevent rotation therein.

2. A clip for bolts and screws, comprising a contractile split tempered metal sleeve, one end terminating in an angular fin adapted to anchor said ring in a bore in the works, said ring adapted to encircle the bolt or screw and frictionally hold the same against retrograde rotative movement.

3. In a device of the class specified, a clip comprising an inherently contractile split sleeve, a screw, a bolt having an unthreaded portion at one end, said sleeve frictionally clamped on said unthreaded portion by its inherent elasticity, whereby to permit of relative longitudinal play of said screw or bolt, but prevent retrograde rotative movement of the same, means at one end of the split sleeve engaging in the bore of the work to prevent rotation therein, and means at the other end of the split adapted to bite into the screw or bolt to additionally prevent retrograde rotation of the screw or bolt.

JOHN HENRY FAHEY.